UNITED STATES PATENT OFFICE.

ROBERT W. LESLEY AND DAVID GRIFFITHS, OF PHILADELPHIA, PA.

MANUFACTURE OF PORTLAND CEMENT.

SPECIFICATION forming part of Letters Patent No. 305,754, dated September 30, 1884.

Application filed March 3, 1884. (No specimens.)

*To all whom it may concern:*

Be it known that we, ROBERT W. LESLEY and DAVID GRIFFITHS, of the city and county of Philadelphia, State of Pennsylvania, have invented a new and useful Improvement in the Art of Manufacturing Portland Cement, of which the following is a specification.

Portland cement is manufactured from clay and chalk, or limestone and clay, and is made by either the "wet" or "dry" process, both of which processes are well known to those skilled in the industry, the manufactured article containing by chemical analysis about seventy per cent. of lime to about thirty per cent. of silica and alumina, and also varying proportions of ferric oxide, soda, potash, and sulphuric acid. While the manufacture has been attended with success in Europe, where the materials are easily obtainable, the industry has not attained a large growth in this country, owing to the difficulty of finding the raw materials advantageously situated and within close reach of each other.

Iron-furnaces in this country have usually been located in limestone regions, with a view to obtaining an economical supply of that material for fluxing purposes, and these furnaces produce constantly immense quantities of iron slag or cinder which hitherto has gone to waste, and has been piled in vast dumps at great cost in labor and storage. The slag, which is ejected from the furnaces at a very high temperature, we have found to contain many of the elements necessary for the manufacture of Portland cement, although largely deficient in lime for that purpose.

The object of our invention is the utilization of this slag or cinder in the manufacture of Portland cement, and this we have found can be accomplished by the combination with it of lime, or lime and magnesia, in any of their forms—whether hydrates, anhydrous carbonates, cement-rocks, or hydraulic limestone—in such proportion as to bring the percentage of lime or lime and magnesia to about seventy per cent. of the manufactured cement and the proportions of silica and alumina to about thirty per cent. of the same. We may at times add to the combination a small proportion of other silicates or hydro-silicates, taking care, however, to preserve the relative proportions, as hereinbefore stated, of lime or lime and magnesia and silica and alumina; but in any such event the lime or lime and magnesia and the slag or cinder still remain the essential ingredients of this mixture. The product thus obtained is treated according to the wet or dry process, as desired; and we find that we can in this way produce a cement having all the characteristics of the best Portland cement, and, furthermore, possessing advantages over the cements now made in strength, regularity, and economy of manufacture.

One way of carrying our invention into practice is as follows: We take lime, or lime and magnesia in any of their forms—whether hydrates, anhydrous carbonates, hydraulic limestone, or cement-rocks—and ascertain to what extent they are deficient in silica and alumina. When this is done, we take iron slag or cinder, which by long exposure to the air has become cracked, broken, and partially pulverized, and, first ascertaining by analysis its constituent parts, add it to the mass before mentioned in such proportions as to bring the percentage of lime or lime and magnesia in the manufactured cement to about seventy per cent. (or say from fifty to sixty or seventy per cent.) and the percentage of silica and alumina to about thirty per cent. (or say from twenty-five to thirty-five per cent.) The compound thus obtained is thoroughly intermixed, is ground together by either the wet or the dry process, is made into bricks or other forms suitable for the kilns, calcined to a clinker, and then ground into the manufactured cement.

Another way of carrying our invention into practice is to take lime, or lime and magnesia in any of their forms, as above stated, and, after ascertaining to what extent the mass thus obtained is deficient in silica and alumina, add to it slag or cinder which has been wetted while still hot (first ascertaining its composition, as above provided) in such proportions as to bring the percentage of lime, silica, and alumina in the manufactured cement substantially as above stated, the object of wetting the slag or cinder as it is drawn from the furnace being to make it porous and spongy, and consequently easy to crush and grind. The materials are then ground all together, wetted, molded into forms, calcined into clinker, and ground again into the manufactured cement.

We desire to be understood that we intend to include within the terms of our claims all of the foregoing-recited methods of applying and using iron slag or cinder for the purpose of manufacturing Portland cement; but do not mean, however, to restrict ourselves to them alone.

Having now described our invention and the best ways known to us of carrying the same into practical effect, we state our claims as follows:

1. The process of manufacturing Portland cement, consisting in combining with lime, or lime and magnesia in any of their forms, as stated, iron slag or cinder in substantially the proportions specified, and subsequently calcining said compound to a clinker and grinding the same, substantially as hereinbefore set forth.

2. The hereinbefore-described method of utilizing iron slag or cinder in the manufacture of Portland cement, consisting in wetting or moistening the slag or cinder after it comes from the furnace and while still hot, so as to bring it to a condition in which it can be easily disintegrated, then combining the same with lime, or lime and magnesia in any of their forms, as stated, in substantially the proportions specified, and subsequently calcining said compound to a clinker and grinding the same, substantially as set forth.

3. The hereinbefore-described product obtained, substantially in the manner set forth, from a mixture whereof lime, or lime and magnesia in any of their forms, as stated, and iron slag or cinder are essential ingredients, in substantially the proportions specified.

In testimony whereof we have hereunto set our hands this 29th day of February, 1884.

R. W. LESLEY.
DAVID GRIFFITHS.

Witnesses:
E. H. GASKILL,
E. H. DOYLE.